(12) United States Patent
DeMartino et al.

(10) Patent No.: US 6,520,689 B2
(45) Date of Patent: Feb. 18, 2003

(54) OPTICAL FIBER SPLICING METHOD AND DEVICE

(75) Inventors: Steven E. DeMartino, West Elmira, NY (US); Michael E. DeRosa, Painted Post, NY (US); Bruce G. Aitken, Corning, NY (US)

(73) Assignee: Corning Incorporated, Corning, NY (US)

( * ) Notice: Subject to any disclaimer, the term of this patent is extended or adjusted under 35 U.S.C. 154(b) by 52 days.

(21) Appl. No.: 09/907,351

(22) Filed: Jul. 17, 2001

(65) Prior Publication Data

US 2003/0016922 A1 Jan. 23, 2003

(51) Int. Cl.[7] .............................................. G02B 6/255
(52) U.S. Cl. .............................. 385/98; 385/96; 385/97; 65/407
(58) Field of Search .............. 385/95–99; 65/406–412; 219/121

(56) References Cited

U.S. PATENT DOCUMENTS

| | | |
|---|---|---|
| 4,078,910 A | 3/1978 | Dalgoutte |
| 4,124,364 A | 11/1978 | Dalgoutte |
| 4,452,506 A | 6/1984 | Reeve et al. |
| 5,201,019 A | 4/1993 | Gallusser et al. |
| 5,246,890 A | 9/1993 | Aitken et al. |
| 5,257,337 A | * 10/1993 | Grigsby et al. ............... 385/99 |
| 5,677,976 A | * 10/1997 | Takahashi .................. 385/140 |
| 6,151,916 A | 11/2000 | Rabinovich |
| 6,213,649 B1 | 4/2001 | Omiya et al. |

FOREIGN PATENT DOCUMENTS

| | | |
|---|---|---|
| EP | 1 039 318 | 9/2000 |
| FI | 94560 | 6/1995 |
| JP | 5-346517 | 12/1993 |

OTHER PUBLICATIONS

K. Egashira et al. "Optical Fiber Splicing with a Low–Power $CO_2$ Laser", Applied Optics, vol. 16, No. 6, pp. 1636–1638 (Jun. 1977).

K. Kinoshita et al. "Two–dimensionally arrayed optical–fiber splicing with a $CO_2$ laser", Applied Optics, vol. 21, No. 19, pp. 3419–3422 (Oct. 1, 1982).

K. Kinoshita et al. "End preparation and fusion splicing of an optical fiber array with a $CO_2$ laser", Applied Optics, vol. 18, No. 19, pp. 3256–3260 (Oct. 1, 1979).

H. Daniel et al. "Glass soldering improves photonic component packaging", Laser Focus World, pp. 121–122 (Nov. 1994).

* cited by examiner

Primary Examiner—John D. Lee
Assistant Examiner—Scott A Knauss
(74) Attorney, Agent, or Firm—James V. Suggs

(57) ABSTRACT

A method for splicing optical fibers is disclosed. The fibers are held by ferrules with a softening temperature at least 30° C. below that of the lower of the glass transition temperatures of the fibers. The ends of the fibers are actively aligned and brought into contact, then energy is applied to fuse the ferrules together, maintaining the alignment of the ends of the fibers. The ferrules may be a low-melting inorganic glass, such as a lead bismuth borosilicate glass. The method and ferrules of the present invention are especially useful in splicing fibers of dissimilar thermomechanical properties.

28 Claims, 5 Drawing Sheets

OPTICAL FIBER SPLICING METHOD AND DEVICE

BACKGROUND OF THE INVENTION

Field of the Invention

The present invention relates generally to optical communications, and particularly to the splicing of optical fibers in optical communications systems and devices.

TECHNICAL BACKGROUND

In the construction of devices for optical communications, and in the deployment of devices and optical fibers in optical communications systems, it is often necessary to splice two optical fibers to one another, so that an optical signal may be transmitted from one to the other. As the mode field diameters of commonly used optical fibers may be as small as about five microns, the splicing operation must be performed with a high degree of precision in order for an optical signal to travel between the two optical fibers without experiencing an untoward amount of loss. For a low-loss splice, it is necessary for the cores of the two optical fibers to be held in substantial optical and physical contact with one another.

One low-loss method for splicing optical fibers is fusion splicing. In this method, an end of one optical fiber is aligned to be in substantial optical and physical contact with an end of another optical fiber. The ends are generally prepared by cleaving or polishing. The aligned, abutted ends of the optical fibers are heated to a temperature above their glass transition temperatures, causing them to soften and melt together. Upon cooling, the melted together area fuses into a continuous joint. When used to form splices between the same type of fibers, or between fibers with similar thermo-mechanical properties, the fusion splicing method works very well, yielding splices with mechanically strong joints and very low optical loss. However, the method is less useful when splicing optical fibers with dissimilar thermomechanical properties. For example, when one optical fiber has a much lower glass transition temperature and a much higher coefficient of thermal expansion than the other, the splice is extremely susceptible to fracture. The instability of the splice is due to the residual mechanical stress formed between the thermomechanically dissimilar materials of the joint upon cooling. The process of fusion splicing optical fibers with widely differing softening temperatures is also difficult. For example, at a temperature sufficient to soften the fiber with the higher softening temperature, the fiber with the lower softening temperature will be significantly distorted due to viscous flow. Lastly, direct fusion splicing may damage heat-sensitive fibers, such as, for example, polarization maintaining fibers.

Passive physical alignment methods have also been used to splice fibers. In general, these methods involve a physical alignment structure holding the ends of two fibers in physical alignment with one another. For example, optical fibers may be held in ferrules, and the ferrules physically aligned by a precision molded sleeve. Alternatively, cleaved ends of two optical fibers may be abutted in a glass sleeve, which is collapsed by softening, thus bringing the fibers into physical alignment with one another. Fibers have also been spliced by placing connectors on the ends of the fibers to be spliced, followed by mating of the connectors. Methods such as these effectively align the outer circumferences of the optical fibers. Thus, satisfactory optical performance ensues only if the cores of both optical fibers are concentric with the outer circumferences of the fibers. This method is not suitable for splicing optical fibers with non-centrosymmetric cross-sections.

One method proven workable for the splicing of dissimilar, non-concentric optical fibers involves the use of an optical path adhesive. In this method, the ends of the optical fibers are aligned, and an optical path adhesive is applied to the area between and around the optical fibers and then cured. However, shrinkage of the adhesive during cure can cause the optical fibers to become somewhat misaligned, increasing the optical loss of the splice. Further, this method requires the design of a robust package that will protect the joint and ensure long-term optical and mechanical reliability.

Accordingly, there remains a need for a method for creating a reliable, low optical loss splice between optical fibers of dissimilar thermomechanical properties and unknown concentricity.

SUMMARY OF THE INVENTION

One aspect of the present invention relates to a method of creating an optical fiber splice including the steps of providing a first optical fiber held by a first ferrule and a second optical fiber held by a second ferrule; aligning the end of the first optical fiber to the end of the second optical fiber; and applying energy to the ferrules, thereby sealing the face of the first ferrule to the face of the second ferrule such that the core of the first fiber and the core of the second fiber remained aligned. The ferrules have softening temperatures at least 30° C. below the lower of the glass transition temperatures of the optical fibers.

Another aspect of the present invention relates to a method of creating an optical fiber splice including the steps of inserting a first optical fiber into a first ferrule such that the end of the first optical fiber is substantially coplanar with the face of the first ferrule; affixing the first optical fiber to the first ferrule; inserting a second optical fiber into a second ferrule such that the end of the second optical fiber is substantially coplanar with the face of the second ferrule; affixing the second optical fiber to the second ferrule; polishing the faces of the ferrules, whereby slight protrusions of the ends of the optical fibers beyond the planes of the faces of the ferrules is produced; aligning the end of the first optical fiber to the end of the second optical fiber; and applying energy to the ferrules, thereby sealing the face of the first ferrule to the face of the second ferrule such that the core of the first fiber and the core of the second fiber remained aligned. The ferrules have softening temperatures at least 30° C. below the lower of the glass transition temperatures of the optical fibers.

Another aspect of the present invention involves a ferrule for use with an optical fiber, the ferrule having a channel dimensioned to receive the optical fiber, wherein the material of the ferrule has a softening temperature at least 30° C. less than the glass transition temperature of the optical fiber.

The present invention results in advantages over existing methods of splicing optical fibers. The methods of the present invention are suitable for use in splicing optical fibers of dissimilar size, mode field diameter, and thermo-mechanical properties. The methods of the present invention are not dependent upon the concentricity of the optical fibers, and are therefore suitable for use with non-centrosymmetric optical fibers. No adhesive is needed in the optical path, obviating concerns about high optical power damage due to the presence of the adhesive. The splice of the present invention is easily formed and is mechanically reliable due to a reduction of residual stress at the joint and the strong interferrule bond. As the person of skill in the art will recognize, the present invention is especially suitable for splicing pairs of optical fibers that are not amenable to typical fusion splicing techniques; for example, multi-component silicate amplifying optical fibers may be reliably spliced to single mode 980 nm pump optical fibers. Further, the method may be advantageously used to splice fibers, such as polarization maintaining fibers, which may be damaged by the intense heat of the fusion splicing process.

Additional features and advantages of the invention will be set forth in the detailed description which follows, and in part will be readily apparent to these skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings illustrate one or more embodiments of the invention, and together with the description serve to explain the principles and operation of the invention.

BRIEF DESCRIPTION OF THE DRAWINGS

The various advantages of the present invention will become apparent to one skilled in the art by reading the following specification and appended claims, and by referencing the following drawings in which:

DETAILED DESCRIPTION OF THE PREFERRED EMBODIMENT

Figure 1:
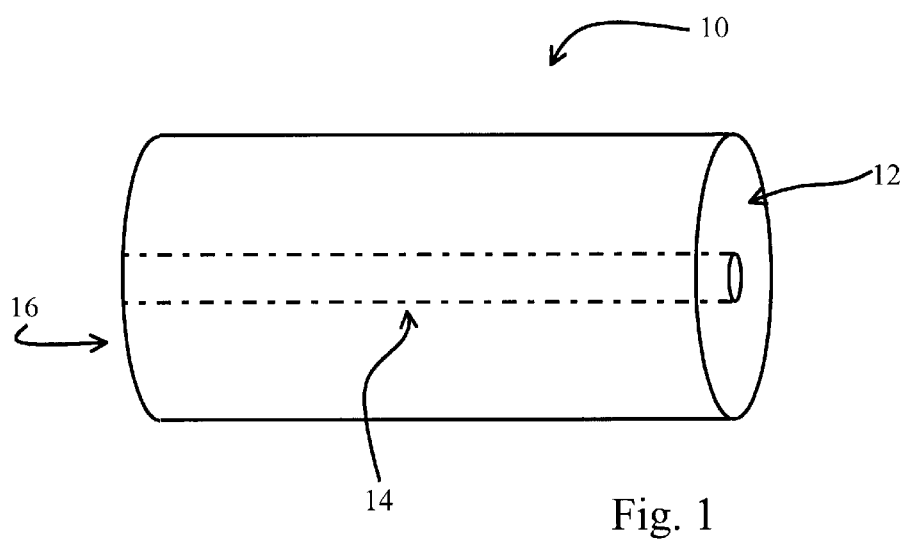
FIG. 1 is a perspective view of a ferrule in accordance with the present invention.

Reference will now be made in detail to the present preferred embodiments of the invention, examples of which are illustrated in the accompanying drawings. Wherever possible, the same reference numerals will be used throughout the drawings to refer to the same or like parts.

Referring now to FIG. 1, a perspective view of an exemplary ferrule in accordance with the present invention is shown. The ferrule 10 has a splicing face 12, a channel 14 shaped to receive an optical fiber, and a back end 16. The ferrules of the present invention are made from a material having a softening temperature at least 30° C. less than the lower of the glass transition temperatures of the two optical fibers to be spliced. For use herein, the softening temperature of a material is defined as the temperature at which the viscosity of the material falls below $10^{7.6}$ poise ($10^{6.6}$ Pa·s). The ferrule material may be an inorganic glass, such as, for example, a tin oxide glass, a lead tin fluorophosphate glass, a lead and/or bismuth silicate glass, a lead and/or bismuth borate glass, a lead and/or bismuth borosilicate glass, an alkali and/or tin zinc phosphate glass, an alkali and/or copper phosphate glass, a tellurite glass, a germanium and/or arsenic sulfide glass, a germanium and/or arsenic selenide glass, a germanium and/or arsenic sulfoselenide glass, a germanium and/or arsenic telluride glass, or a germanium and/or arsenic selenotelluride glass. In an exemplary embodiment, the ferrules may be made from a low softening temperature lead bismuth borosilicate glass with a composition of 42.5 mol % PbO, 17.5 mol % $Bi_2O_3$, 30 mol % $B_2O_3$, and 10 mol % $SiO_2$. This glass has a glass transition temperature of about 345° C., a softening temperature of about 395° C., and is estimated to have a thermal expansion coefficient of about 10.5 ppm/° C.

The ferrules may be made in any convenient manner known to one of skill in the art. For example, a tube of the glass may first be fabricated by any method known to one of skill in the art, such as, for example, extrusion, downdraw from a melt, spincasting in a tubular mold, or built-in casting. The tube may then be redrawn to give a smaller tube, with outer and inner diameters identical to those of the desired ferrule. The drawn tubing may then be cut, ground, and polished to yield ferrules of the desired length and geometry. For example, the ferrules may be ground and polished with faces 12 perpendicular to the axis of the channel 14. In an alternative embodiment, the ferrules are ground and polished with faces 12 at an angle, such as, for example, eight degrees, to the axis of the channel 14. Ferrules of the lead bismuth borosilicate material detailed above were made by first extruding discs of the glass into tubing with a 10 nm outer diameter and a 2 mm inner diameter. The tubing was subsequently redrawn on a draw tower to make a thinner tubing with an inner diameter approximating the diameter of an optical fiber. The thinner tubing was cut and polished to yield the ferrules. As a person of skill in the art will appreciate, the size and shape of the ferrule 10 will depend upon the details of the optical fibers, devices and processes of interest, and may vary from the exemplary embodiments detailed herein; these alternative embodiments are contemplated to be part of the present invention. For example, while cylindrical ferrules are described in this application, ferrules of other shapes, such as rectangular, triangular, or ellipsoidal, may be used in the present invention.

Figure 2:
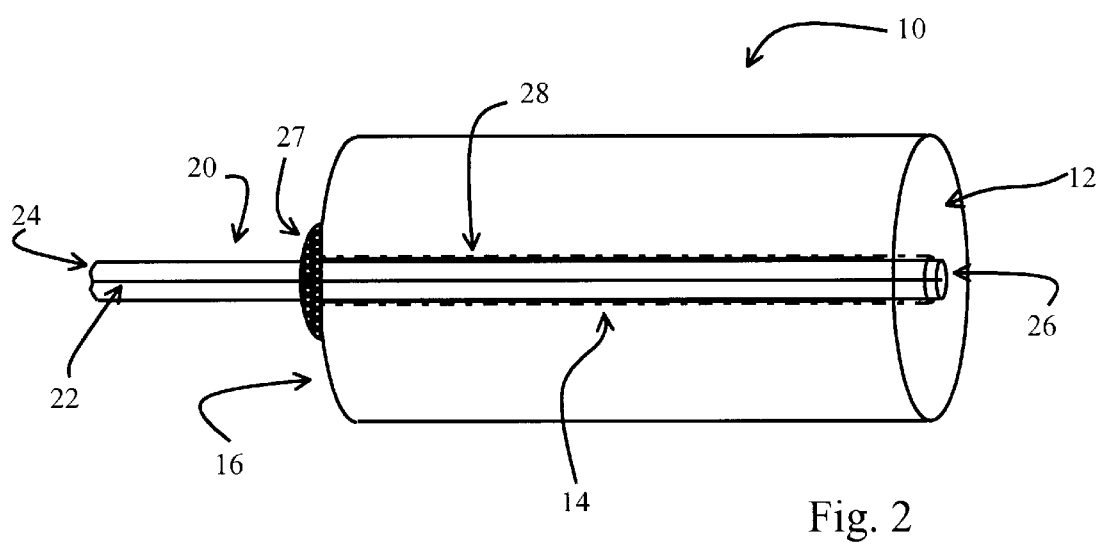
FIG. 2 is a perspective view of a ferrule-held optical fiber.

The ferrules are designed to hold optical fibers, as shown in the view of an exemplary ferrule-held optical fiber of FIG. 2. The channel 14 of the ferrule is dimensioned to have a diameter at least as large as that of the optical fiber with which it will be used. The optical fiber is preferably stripped of its polymer coating before use, leaving the core 22 and the cladding 24. Optical fiber 20, having an end 26, extends through the channel 14 of the ferrule, and is held in place in the ferrule by any method known to those of skill in the art. For example, as shown in FIG. 2, the optical fiber 20 may be inserted into the channel 14 of the ferrule 10 such that the end 26 of the optical fiber protrudes slightly from the face 12 of the ferrule. Alternatively, the end of the optical fiber 22 may be inset slightly from the face 12 of the ferrule. A conventional epoxy 27 is applied to the back end 16 of the ferrule, and wicks into a small amount of space between the wall of the channel 14 and the optical fiber 20. The epoxy is cured, leaving a thin adhesive layer 28 between the wall of the channel 14 and the optical fiber 20. The adhesive layer 28 may extend the length of the ferrule, or, as is shown in FIG. 2, may not extend the full length of the ferrule. A suitable epoxy for use in affixing the optical fiber 20 to the ferrule 10 is Epo-Tek 353 ND, available from Epoxy Technologies, of Billerica, Mass. As is understood in the art, it may be desirable to polish the face of the ferrule-held fiber in order to ensure low surface roughness and good optical quality of the end 26 of the optical fiber, as well as bring the face 12 of the ferrule and the end 26 of the optical fiber to within a few microns of each other. The polishing step may be performed in any way known by those of skill in the art, such as by using an automated mechanical polisher. The plane of polishing may be perpendicular to the axis of the channel 14 of the ferrule, or may be at an angle, such as, for example, between zero and fifteen degrees, to the axis. In one embodiment of the invention, ferrules are polished at an eight degree angle. As the material of the ferrule may be softer than the material of the optical fiber, the optical fiber end 26 may protrude from the polished face 12 of the ferrule by up to about two microns.

The ferrules and methods of the present invention may be used with optical fibers of any desired type. For example, suitable fibers for use include single mode transmission fiber, multimode transmission fiber, rare earth element-doped amplifying fibers, single mode pump fiber, polarization maintaining fiber, and the like. The two optical fibers of a splice may be of the same type or of different types. For example, the present invention may be used to splice two single mode transmission fibers.

The present invention is especially advantageous in splicing non-concentric fibers. As used herein, a non-concentric fiber is defined as a fiber with non-concentric core and cladding cross-sections, or with a non-circular core or cladding cross-section. An example of such a fiber is an erbium-doped multi-component silicate optical fiber, such as those described in commonly owned and copending U.S. patent application Ser. No. 09/288,454, filed on Apr. 8, 1999 (now U.S. Pat. No. 5,410,467). The present invention is also suitably used in the splicing of two optical fibers with dissimilar thermomechanical characteristics. Traditional fusion spliced joints are highly susceptible to failure when residual stresses are greater than about 5 GPa {725 psi}. In particular, use of the present invention is desirable in the splicing of two types of optical fiber with a difference in coefficient of thermal expansion of about 4.5 ppm/° C. or greater. Further, the present invention is especially useful in the splicing of two types of optical fiber with a difference in softening temperature of at least about 200° C. For example, the present invention may be used to splice a highly non-concentric, high coefficient of thermal expansion erbium-doped multi-component silicate optical fiber to a concentric, low coefficient of thermal expansion germania-doped silica fiber. The difference in coefficient of thermal expansion in this example is about 6.5 ppm/° C. In an alternative exemplary embodiment, the present invention may be used to splice an erbium-doped multi-component silicate optical fiber to a single mode 980 pump fiber, such as CS980, available from Corning Incorporated.

Figure 3:
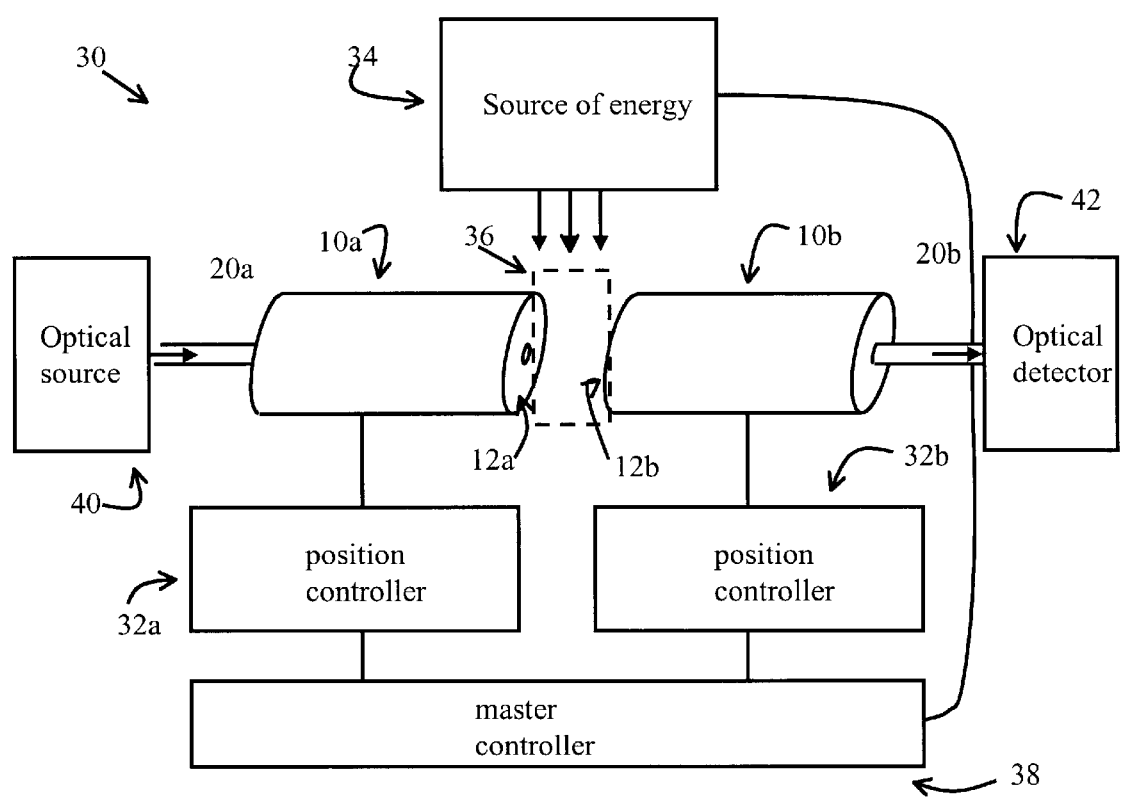
FIG. 3 is a schematic of an exemplary active alignment and splicing system for use in the present invention.

Referring now to FIG. 3, a schematic of an exemplary active alignment and splicing system is shown. The active alignment and splicing system 30 includes independent position controllers 32a and 32b for each ferrule 10a and 10b, as well as a source of energy 34 directed to a joint area 36. The independent position controllers 32a and 32b must have fine control sufficient to align the optical fibers so that the cores of the optical fibers are in substantial optical alignment with one another and centered in the joint area 36. The position controllers may be, for example, stepper motors or piezoelectric actuators. In the splicing operation, it is important that the fibers not be allowed to rotate around their long axis, so that two angled ferrules may remain in angular registration with each other. The source of energy 34 must be sufficient to raise the temperature of the faces 12a and 12b of the ferrules above their softening temperature so that they flow together and seal to one another. The source of energy may be, for example, a heating element or a source of infrared radiation. For example, a tungsten filament, a $CO_2$ laser, or a quartz halogen lamp may be employed as the source of energy 34. The position controllers and the source of energy may be controlled manually, or, as shown in FIG. 3, by a master controller 38. The master controller 38 may be, for example, an integrated circuit or a digital computing device. The system 30 also includes an optical source 40, and an optical detector 42. The optical source 40 is optically coupled to the first optical fiber 20a, and the optical detector 42 is optically coupled to the second optical fiber 20b. The optical source 40 may be, for example, a light emitting diode, a laser, or a lamp. The optical detector 42 may be, for example, a photodiode, a CCD element, or a thermopile. In order to facilitate the coupling of the optical signal into the first optical fiber, the optical source 40 and the optical detector 42 may be connectorized or include coupling optics, as will be appreciated by a person of skill in the art. In order to improve the signal-to-noise ratio of the optical signal 40 may be chopped, and lock-in detection techniques used in connection with the optical detector 42. If a master controller 38 is used, the source 40 and detector 42 may electronically coupled to the master controller 38.

Figure 4A:
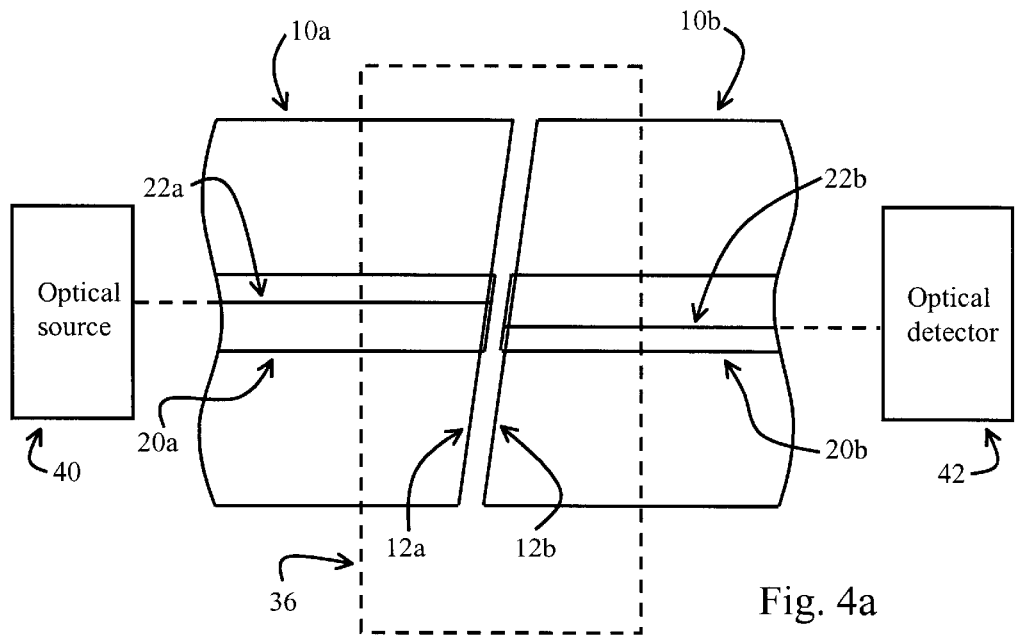
FIG. 4a–4d are diagrams showing the splicing process.
Figure 4B:
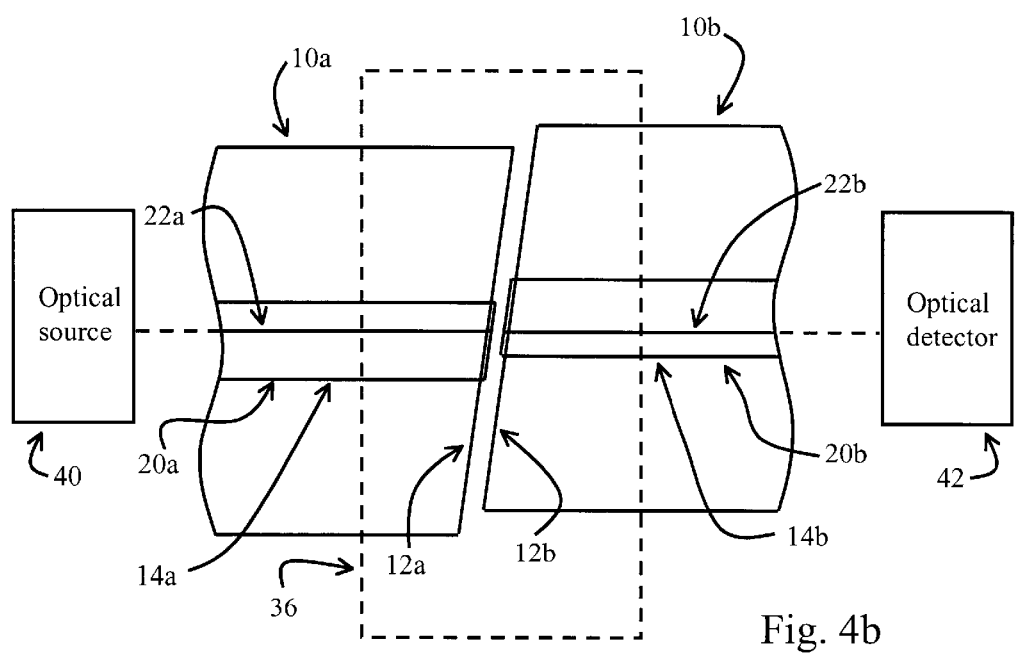
Figure 4C:
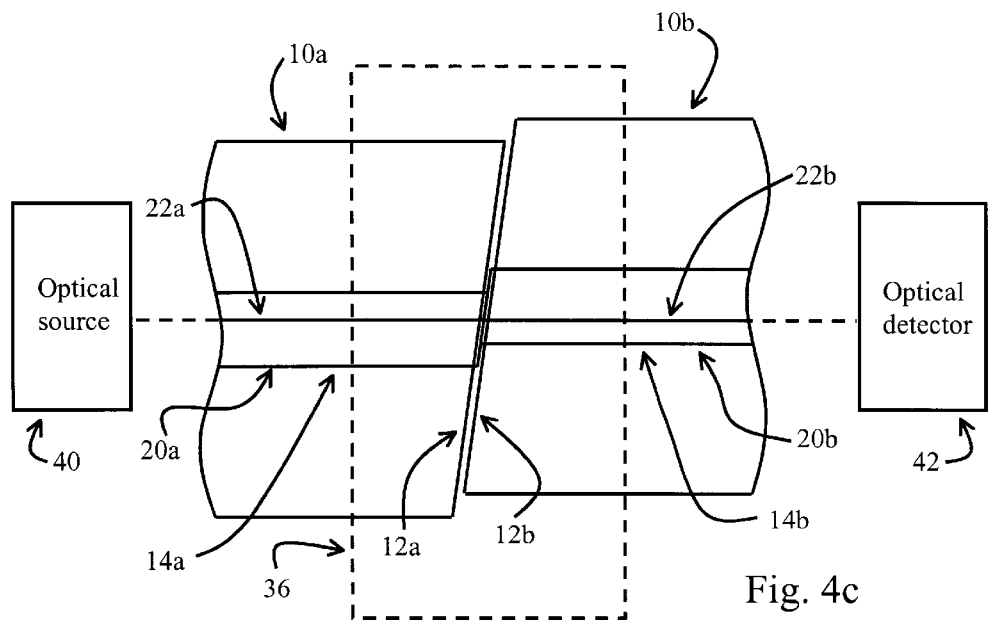

The splicing operation includes the steps of active alignment and sealing. As used herein, active alignment is defined as a process wherein the ends of two optical fibers are positioned in order to maximize the optical signal transmitted from the first optical fiber and measured in the second optical fiber. An exemplary active alignment process is shown in a magnified side view in FIGS. 4a–4d. In this example, the ferrules are ground and polished with an eight degree angle to the axis of the channel in order to reduce back-reflections at the optical fiber interface, as is well understood in the art. In the case of angle-cut ferrules, it is important to align the ferrules such that the planes of the faces are parallel. In these views, only the splicing ends of the ferrules are shown. First, as shown in FIG. 4a, the faces 12a and 12b of the ferrules are brought very close to one another, for example, within 20 μm, with the axes of the channels 14a and 14b substantially parallel. The initial alignment desirably brings the faces 12a and 12b of the ferrules into the joint area 36. The outsides of the ferrules may be physically aligned to one another as an initial configuration. As is evident from FIG. 4a, the physical alignment of the ferrules is insufficient to bring the cores of the optical fibers, as determined by the optical detector, into alignment. Consequently, the ferrules are then moved with respect to one another in the plane perpendicular to the axes of the channels 14a and 14b, iteratively maximizing the signal read at the detector 42. The result of this active alignment is shown in FIG. 4b. Although the ferrules and the claddings of the optical fibers do not line up, the cores of the optical fibers are well aligned. As the person of skill in the art will understand, the configuration giving the maximum signal at the optical detector 42 will depend on the concentricity of the optical fibers as well as how the optical fibers are held in the ferrules, and may be quite different than the initial configuration. The active alignment process assures a splice with minimal optical loss in the face of these variables. As shown in FIG. 4c, the ferrule-held optical fiber assemblies are then brought into contact with a slight amount of mechanical force by moving them along the axis of the channels. In the case of ferrules with protruding optical fiber ends 26a and 26b, the optical fiber ends will be in physical contact in the joint area 36. In the case of ferrules with inset optical fiber ends 26a and 26b, the faces 12a and 12b of the ferrules will be in physical contact in the joint area 36.

Figure 4D:
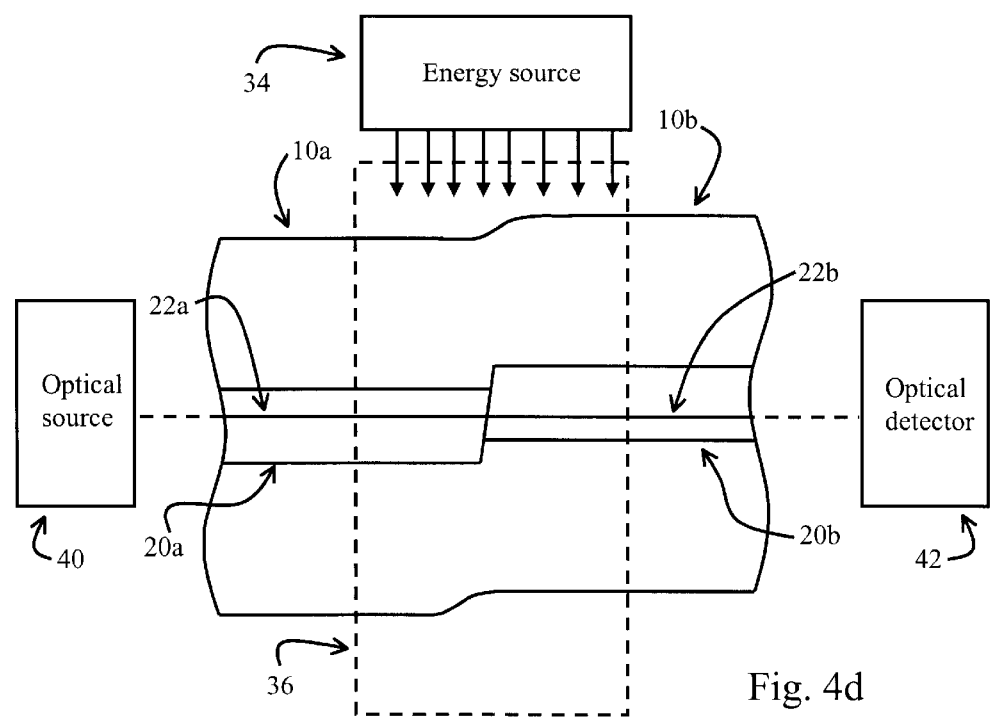

FIG. 4d shows an example of a sealing step of the inventive splicing operation. After optical and physical contact is achieved as described in connection with FIG. 4, energy is directed into the joint area 36 by the source of energy 34. The energy, which as described above may be heat from a heating element, or infrared radiation from a laser or a lamp, is sufficient to raise the temperature of the faces of the ferrules to near their softening temperature, allowing them to flow together. As shown in FIG. 4d, in the case of slight protrusion of the fiber ends 26a and 26b from the faces 12a and 12b of the ferrules, the ferrule material flows slightly to fill the gap. In the sealing process, the ferrules are brought to near or above their softening temperature, but the optical fibers are at least 30° C. below their glass transition temperatures. As the skilled artisan will appreciate, the temperature will depend on the materials of the ferrules and the optical fibers, and may be varied throughout the sealing process to yield a splice with relatively low residual stress.

In an exemplary embodiment of the invention, a first optical fiber 20a, having a core 22a, a cladding 24a, and an end 26a, is an erbium-doped multi-component silicate fiber having a glass transition temperature of about 900° C., and the second optical fiber 20b, having a core 22b, a cladding 24b, and an end 26b, is a CS980 single mode 980 nm pump optical fiber having a glass transition temperature of about 1500° C. The ferrules 10a and 10b are made of lead bismuth borosilicate, and have external diameters of 800 $\mu$m, channels 14a and 14b with diameters of 150 $\mu$m, and lengths of 3 mm, and have faces 12a and 12b, and back ends 16a and 16b. The lead bismuth borosilicate material has a softening temperature of about 395° C., which is about 505° C. lower than the glass transition temperature of the multi-component silicate optical fiber, and about 1105° C. below the glass transition temperature of the CS980 optical fiber. The ferrules are manufactured as described above with faces 12a and 12b at an angle of eight degrees to the plane perpendicular to the channel 14. The optical fibers 20a and 20b are inserted into ferrules 10a and 10b so that the ends 26a and 26b of the optical fibers are substantially even with the faces 12a and 12b of the ferrules. Epo-Tek 353 ND is applied to the back ends of the ferrules, and allowed to wick into the space between the channel walls and the optical fibers by capillary action. The adhesive is cured, yielding adhesive layers 28a and 28b, which hold the optical fibers in the ferrules as illustrated in FIG. 2. Next, the faces 12a and 12b of the ferrule-held optical fiber assemblies are polished at an eight degree angle using a Domaille Engineering APM-HDC-4000 polisher equipped with a PF-F08-12 polishing fixture ferrule. As the lead bismuth borosilicate ferrule material is much softer than the materials of the optical fibers, the polishing step removes a greater thickness of ferrule material than of optical fiber material. Thus, the ends 26a and 26b of the optical fibers protrude from the faces 12a and 12b of the ferrules by several hundred nanometers. The ferrules 10a and 10b holding the optical fibers 20a and 20b are assembled in a Vytran Large Diameter Splicing System and Glass Processing Workstation, available from Vytran Corporation, Morganville, N.J. This system includes position controllers with micron resolution as well as a filament fusion heater for fusing the ferrules. The ferrules are held such that the angled faces 12a and 12b lie in parallel planes. An optical signal from a connectorized fiber-coupled light emitting diode 40, operating at 1550 nm and available from Thor Labs, Newton, N.J., is launched into the first optical fiber 20a. A silicon photodetector 42 electronically coupled to a Newport Dual Channel Optical Power meter, Model number 2832-C, available from Newport Corporation, Irvine, Calif., is coupled to the second optical fiber 20b. Controlling the positional controllers of the Vytran system manually, the faces of the ferrules are brought to within about 20 microns of one another. The manual position controllers are then used to move the ferrules until a maximum signal on the photodetector is achieved. The ends 26a and 26b of the fibers are brought into mechanical contact, and the filament fusion heater is activated, fusing the ferrules together. The temperatures reached in the fusion process are about 450° C., and do not approach the glass transition temperatures of the optical fibers, so no distortion of the fiber ends occurs. The splice is preferably cooled such that a minimal amount of stress is formed in the joint. The splice may also be annealed to remove stress in the joint.

In an alternative embodiment, a $CO_2$ laser may be used as the source of energy for fusion of the ferrules. As the person of skill in the art will understand, a visible alignment beam collinear with the $CO_2$ beam may be used to aid in alignment of the ferrules in the joint area. Lenses may be used to focus the beam in the joint area, and beam splitting optics may be used to direct $CO_2$ beams from different directions into the joint area, thus providing for more uniform heating. Radiation from a $CO_2$ laser has been focused with a lens to fuse two lead silicate bars together; as such, the skilled artisan would expect that a $CO_2$ laser may be used advantageously in the present invention. Alternatively, a quartz halogen lamp, desirably with appropriate focusing optics, may be used as the source of energy 34.

Figure 5:
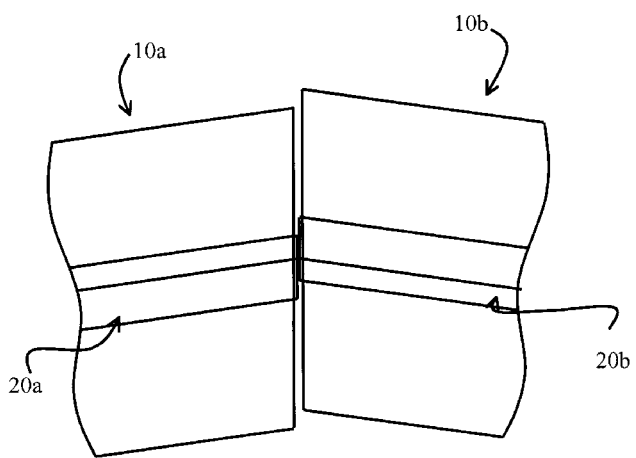
FIG. 5 is a side view of an angled splice.

In an alternative embodiment, shown in side view in FIG. 5, two dissimilar fibers may be spliced with a nonzero angle between the axes of their cores. The desired angle may be calculated by the skilled artisan to maximize the refraction of light from the first fiber 20a having, for example, a low refractive index, to the second fiber 20b having, for example, a high refractive index. For use in such an angled splice, one or both ferrules 10a and 10b may be angled. Using this method, total loss due to reflection and refraction may be minimized.

The splicing process of the present invention results in a strong, reliable, low-loss splice, regardless of the difference in concentricities and thermomechanical properties of the fibers. As the splice is made by fusing two pieces of identical material, the ferrules, over a relatively large cross-sectional area, it is very strong. Once the ferrules are fused together, shifting or misalignment of the splice is unlikely. Since both ferrules used in making the splice are made of the same material, the splices of the process described herein will have lower interfacial stresses and should not exhibit failure due to the presence of thermomecharical stress during any temperature cycling. Since the splicing process actively alighns the optical fibers, it does not depend on the concentricities of the fibers, and does not require the ferrules to be made with unduly high tolerances. No adhesive is needed in the optical path, obviating concerns about high optical power damage of the adhesive. The splicing process of the present invention is especially useful in the splicing of fibers with dissimilar concentricities and thermomechanical properties.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method of creating an optical fiber splice comprising the steps of:
   providing a first optical fiber having an end held by a first ferrule having a splicing face and a channel;
   providing a second optical fiber having an end held by a second ferrule having a splicing face and a channel;
   aligning the end of the first optical fiber to the end of the second optical fiber; and
   applying energy to the ferrules, thereby sealing the face of the first ferrule to the face of the second ferrule such that the core of the first fiber and the core of the second fiber remain aligned,
   wherein the first ferrule and the second ferrule have softening temperatures at least 30° C. below the lower of the glass transition temperatures of the first optical fiber and the second optical fiber.

2. The method of claim 1 wherein the alignment of the first optical fiber to the second optical fiber is achieved through an active alignment process.

3. The method of claim 1 wherein at least one of the first optical fiber and the second optical fiber has a non-centrosymmetric cross-section.

4. The method of claim 1 wherein at least one of the first optical fiber and the second optical fiber is doped with a rare earth element.

5. The method of claim 1 wherein at least one of the first optical fiber and the second optical fiber is a multi-component silicate fiber.

6. The method of claim 1 wherein the first fiber is an amplifying fiber with a noncentrosymmetric cross-section, and the second fiber is a non-amplifying fiber with a substantially centrosymmetric cross-section.

7. The method of claim 6 wherein the core of the second fiber comprises a silica material.

8. The method of claim 1 wherein the difference between the coefficient of thermal expansion of the first optical fiber and the second optical fiber is greater than 4.5 ppm/° C.

9. The method of claim 1 wherein the first ferrule and the second ferrule are made from an inorganic glass.

10. The method of claim 9 wherein the inorganic glass is selected from the group consisting of tin oxide glasses, lead tin fluorophosphate glasses, lead and/or bismuth silicate glasses, lead and/or bismuth borate glasses, lead and/or bismuth borosilicate glasses, alkali and/or tin zinc phosphate glasses, alkali and/or copper phosphate glasses, tellurite glasses, germanium and/or arsenic sulfide glasses, germanium and/or arsenic selenide glasses, germanium and/or arsenic sulfoselenide glasses, germanium and/or arsenic telluride glasses, and germanium and/or arsenic selenotelluride glasses.

11. The method of claim 1 wherein each of the first ferrule and the second ferrule are polished so that the splicing face makes an angle of between 0 and 15 degrees with the plane perpendicular to the channel.

12. The method of claim 1 wherein the energy is infrared radiation.

13. The method of claim 12 wherein the infrared radiation is provided by a device selected from the group consisting of a $CO_2$ laser and a quartz halogen lamp.

14. The method of claim 1 wherein the energy is thermal energy.

15. The method of claim 14 wherein the thermal energy is provided by a resistive heating element.

16. A method of creating an optical fiber splice comprising the steps of:
   inserting a first optical fiber having an end into a first ferrule having a splicing face, whereby the end of the first optical fiber is substantially coplanar with the splicing face of the first ferrule;
   affixing the first optical fiber to the first ferrule;
   polishing the face of the first ferrule, whereby a slight protrusion of the end of the first optical fiber beyond the plane of the first ferrule is produced;
   inserting a second optical fiber having an end into a second ferrule having a splicing face, whereby the end of the second optical fiber is substantially coplanar with the splicing face of the second ferrule;
   affixing the second optical fiber to the second ferrule;
   polishing the face of the second ferrule, whereby a slight protrusion of the end of the second optical fiber beyond the plane of the second ferrule is produced;
   aligning the end of the first optical fiber to the end of the second optical fiber; and
   applying sufficient energy to the ferrules to fuse them together,
   wherein the first ferrule and the second ferrule have softening temperatures at least 30° C. below the lower of the glass transition temperatures of the first optical fiber and the second optical fiber.

17. The method of claim 16 wherein the optical fibers are affixed to the ferrules with a polymeric adhesive.

18. The method of claim 16 wherein the alignment of the first optical fiber to the second optical fiber is achieved through an active alignment process.

19. The method of claim 16 wherein the first optical fiber, the second optical fiber, or both have a noncentrosymmetric cross-section.

20. The method of claim 16 wherein the first optical fiber, the second optical fiber, or both are doped with a rare earth element.

21. The method of claim 16 wherein the first optical fiber, the second optical fiber, or both are multi-component silicate fibers.

22. The method of claim 16 wherein the first optical fiber and the second optical fiber have different coefficients of thermal expansion.

23. The method of claim 16 wherein the first ferrule and the second ferrule are made from an inorganic glass.

24. The method of claim 16 wherein the first ferrule and the second ferrule are made from a material selected from the group consisting of tin oxide glasses, lead tin fluorophosphate glasses, lead and/or bismuth silicate glasses, lead and/or bismuth borate glasses, lead and/or bismuth borosilicate glasses, alkali and/or tin zinc phosphate glasses, alkali and/or copper phosphate glasses, tellurite glasses, germanium and/or arsenic sulfide glasses, germanium and/or arsenic selenide glasses, germanium and/or arsenic sulfoselenide glasses, germanium and/or arsenic telluride glasses, and germanium and/or arsenic selenotelluride glasses.

25. The method of claim 16 wherein the energy is infrared radiation.

26. The method of claim 25 wherein the infrared radiation is provided by a device selected from the group consisting of a $CO_2$ laser and a quartz halogen lamp.

27. The method of claim 16 wherein the energy is thermal energy.

28. The method of claim 27 wherein the thermal energy is provided by a resistive heating element.

* * * * *